United States Patent
Dintheer et al.

(10) Patent No.: US 10,463,034 B2
(45) Date of Patent: Nov. 5, 2019

(54) UNIVERSAL FISHING ROD HOLDER

(71) Applicants: Garry Roy Dintheer, Medicine Hat (CA); Brad Clifford Martin, Ross Spur (CA)

(72) Inventors: Garry Roy Dintheer, Medicine Hat (CA); Brad Clifford Martin, Ross Spur (CA)

( * ) Notice: Subject to any disclaimer, the term of this patent is extended or adjusted under 35 U.S.C. 154(b) by 30 days.

(21) Appl. No.: 15/974,104

(22) Filed: May 8, 2018

(65) Prior Publication Data

US 2019/0008130 A1 Jan. 10, 2019

Related U.S. Application Data

(60) Provisional application No. 62/530,693, filed on Jul. 10, 2017.

(51) Int. Cl.
*A01K 97/10* (2006.01)
*F16B 1/00* (2006.01)
*F16M 13/02* (2006.01)
*F16B 2/08* (2006.01)

(52) U.S. Cl.
CPC ............... *A01K 97/10* (2013.01); *F16B 1/00* (2013.01); *F16M 13/022* (2013.01); *F16B 2/08* (2013.01); *F16B 2001/0028* (2013.01)

(58) Field of Classification Search
CPC .............................. A01K 97/10; F16M 13/022
See application file for complete search history.

(56) References Cited

U.S. PATENT DOCUMENTS

| | | | | |
|---|---|---|---|---|
| 4,463,511 A * | 8/1984 | Copfer | ............... | A01K 97/10 248/520 |
| 4,739,914 A * | 4/1988 | Pothetes | ............ | A01K 97/10 224/247 |
| 4,817,323 A * | 4/1989 | Braid | ................ | A01K 97/10 43/21.2 |
| 5,072,539 A * | 12/1991 | Greenberg | ......... | A01K 97/10 211/70.2 |
| 6,254,055 B1* | 7/2001 | Lamberson, Jr. | ..... | A01K 97/10 206/315.11 |
| 6,471,103 B1* | 10/2002 | Frese | ............... | A01K 97/08 206/249 |
| 8,375,622 B1* | 2/2013 | Holzmann, Jr. | ...... | A01K 97/10 43/21.2 |
| 9,137,981 B1* | 9/2015 | Groves, Jr. | ........ | A47B 81/005 |
| 9,468,200 B1* | 10/2016 | Davis | ............... | A01K 97/00 |

(Continued)

*Primary Examiner* — Bradley Duckworth (57) ABSTRACT

A fishing rod holder consists of a first panel, a second panel, a plurality of connecting members, a first strap portion, and a second strap portion. The plurality of connecting members is positioned in between the first panel and the second panel. The spacing between each of the plurality of connecting members allows a user to position a fishing rod handle in between an arbitrary connecting member and an adjacent connecting member selected from the plurality of connecting members. Since the plurality of connecting members is radially positioned, the fishing rod can be mounted at a preferred angle. The first strap portion and the second strap portion are used for attaching purposes. When the apparatus is being used with an external weighted object, the first strap portion and the second strap portion are wrapped around the external weighted object.

19 Claims, 6 Drawing Sheets

(56) References Cited

U.S. PATENT DOCUMENTS

| | | | | |
|---|---|---|---|---|
| 9,924,785 | B1* | 3/2018 | Gilmore | A45F 5/021 |
| 10,039,275 | B2* | 8/2018 | Grillo | A01K 97/10 |
| 2005/0145663 | A1* | 7/2005 | Samuels | A01K 97/06 |
| | | | | 224/575 |
| 2010/0288806 | A1* | 11/2010 | Wier | A01K 97/08 |
| | | | | 224/257 |
| 2012/0248166 | A1* | 10/2012 | Gold | F16M 11/041 |
| | | | | 224/545 |
| 2015/0296763 | A1* | 10/2015 | Sanders | A01K 97/10 |
| | | | | 224/200 |

\* cited by examiner

UNIVERSAL FISHING ROD HOLDER

The current application claims a priority to the U.S. Provisional Patent application serial number 62/530,693 filed on Jul. 10, 2017.

FIELD OF THE INVENTION

The present invention relates generally to fishing rod holders. More specifically, the present invention is a versatile fishing rod holder that can be attached to any weighted stationary object.

BACKGROUND OF THE INVENTION

The original intent for the present invention is to provide anglers with the ability to secure their fishing rod while bottom fishing in any shore environment such as on rocks, boulders, hard gravel shore, docks/piers, soft sand and root infested banks. In general, the hook is attached to a fishing rod which is fitted with a fishing reel. The fishing rod holder can be secured onto an angler's fishing tackle bag or box which is used for the support of the device. After further development, the present invention can be secured onto more than just the surrounding terrain such as a chair, a pole, a bucket, a cooler or virtually any object with a reasonable weight. The use of the present invention is not limited to anglers and can be used by a fisherman who utilizes a fishing rod or another piece of equipment that the fisherman may deem useful with the present invention. Generally, the user of the present invention is any person that may deem the versatile fishing rod holder useful. In particular, the present invention provides fishermen who uses a fishing rod the ability to confidently enjoy their fishing experience without a concern for the terrain.

Many fishing rod holders comprise a mounting mechanism that requires the user to mount the device onto an existing structure such as the ledge of a fishing pier. Mountable fishing rod holders typically require on-site assembly of numerous components. Mounting fishing rod holders might not be useful to a user who decides to go fishing in an off-shore environment that does not have a particular pier/dock or other structure that allows for rod mounting. In an off-shore environment, a staked fishing rod holder may be found more useful. The staked fishing rod holder can be staked into the sand or dirt by the shore. But in the case that the user changes location to, for example, a rocky terrain, this fishing rod holder might be useless for the user. A user could attempt to utilize the staked fishing rod holder in an alternate terrain, but such attempts could also be dangerous and lead to a damaged or lost fishing rod. An alternative to these two types of fishing rod holders might be a strapped fishing rod holder. Within the realm of strapped fishing rod holders, the strapped fishing rod holder can be worn around the waist or through the belt loops of a fisherman. Although a strapped fishing rod holder allows the user to hold a rod handsfree, the user is required to be attached to the fishing rod at all times. The range of movement is restricted in addition to the angle in which the rod is held. Often, the type of fishing rod holder is catered to the terrain of the location that a user chooses to fish at and poses a number of restrictions onto the user. Many fishing rod holders are not sufficiently versatile to be useful in any situation.

An objective of the present invention is to allow users to have a fishing rod holder that can be used in a variety of terrains. In particular, the present invention is a versatile fishing rod holder that can be strapped to virtually any object of reasonable weight. Thus, the user need not be with the fishing rod at all times. The user is not burdened with the need to pack every type of rod holder. The user can confidently go on a fishing trip with a single device that can be used in any terrain. When large weighted objects cannot be found, the present invention can be used with a tackle bag or box to hold the fishing rod. The present invention could also be strapped to a large rock/stone, driftwood, tree, pole, pail, bucket, a chair, belly boat, pontoon boat, or virtually anything that is on hand. The fishing rod holder could be strapped vertically or horizontally which provides the user further flexibility in the orientation of the fishing rod holder. The user can secure the universal fishing rod according to the shape and type of object. The versatility of the present invention is attributed to the fact that the present invention can be secured over, under, or around any object. This versatility allows the user to be free from restrictions that other fishing rod holders may pose. This versatility additionally allows flexibility in the angle that the user desires to place the fishing rod. The user may place the fishing rod at any angle with respect to the horizontal. The physical fishing rod holder can fit any standard fishing rod at a variety of angles. The present invention contains spacing around the circumference. The spacing allows the user to place the butt end of the fishing rod in and through the present invention. The spacing further allows the fishing rod to be secured at multiple rod tip angles. The ability to secure the fishing rod at varying angles allows the user to fish at any elevation. In the case that the user is on an elevated pier or at ground level, the user can adjust the angle of the fishing rod accordingly. The present invention is also made to be simple and compact. The present invention is a single unit rather than a series of multiple components that require on-site assembling. The portable and compact aspect of the present invention is a desirable and helpful characteristic due to how the sport of fishing readily requires a number of pieces. The present invention can easily be slipped into a user's fishing tackle bag/box, strapped around a tackle bag/box or could be worn around a person's waist/shoulder, thereby freeing up valuable tackle space. In the case that the user decides to maintain more than one fishing rod, the user can easily pack a number of the present invention without being concerned about space within the user's tackle bag. This present invention provides a versatile and portable means of a fishing rod holder for users who may go fishing in varying terrains. This present invention further provides users a means of holding their fishing rods at varying angles.

DETAIL DESCRIPTIONS OF THE INVENTION

All illustrations of the drawings are for the purpose of describing selected versions of the present invention and are not intended to limit the scope of the present invention.

The present invention introduces a fishing rod holder that can hold a standard fishing rod at the handle. The effective design of the present invention allows the user to mount the fishing rod at a preferred angle. Additionally, the present invention allows the present invention to be attached to a weighted object in the vicinity. Thus, the need to have an external fishing rod mount is eliminated.

As seen in FIGS. 1-4, to fulfill the intended functionalities, the present invention comprises a first panel 1, a second panel 2, a plurality of connecting members 6, a first strap portion 7, and a second strap portion 8. The first panel 1 and the second panel 2 form the housing of the present invention. In the preferred embodiment of the present invention, the first panel 1 and the second panel 2 are circular in shape. However, the shape of the first panel 1 and the second panel 2 can be different in other embodiments of the present invention. The plurality of connecting members 6 is used to position a handle of the fishing rod in between the first panel 1 and the second panel 2. When in use, the present invention is attached to an external weighted object via the first strap portion 7 and the second strap portion 8. To do so, the first strap portion 7 and the second strap portion 8 extend from the first panel 1 or the second panel 2. Since the first strap portion 7 and the second strap portion 8 are flexible, the present invention can be attached to an external weighted object of any shape.

As mentioned before, the handle of the fishing rod is held in between the first panel 1 and the second panel 2 that are centrally aligned to each other. To do so, the first panel 1 is terminally mounted to the plurality of connecting members 6, wherein the plurality of connecting members 6 is arranged in a circular pattern adjacent to a perimeter of both the first panel 1 and the second panel 2. The length of each of the plurality of connecting members 6 can vary in different embodiments of the present invention. On the other hand, the second panel 2 is terminally mounted to the plurality of connecting members 6 opposite the first panel 1 and along the plurality of connecting members 6. To obtain the circular pattern, each of the plurality of connecting members 6 is radially and equidistantly positioned in between the first panel 1 and the second panel 2. As an example, an arbitrary member from the plurality of connecting members 6 can be positioned at a 30-degree angle from an adjacent member of the plurality of connecting members 6 relative to a center point of both the first panel 1 and the second panel 2. The distance between each of the plurality of connecting members 6 can vary in other embodiments of the present invention. To be attached to the external weighted object, the first strap portion 7 is terminally connected to the second panel 2. To apply an opposing force to the force applied at the first strap portion 7, and thereby press the second panel 2 against the external weighted object, the second strap portion 8 is terminally connected to the second panel 2 opposite the first strap portion 7 and across the second panel 2.

Figure 3:
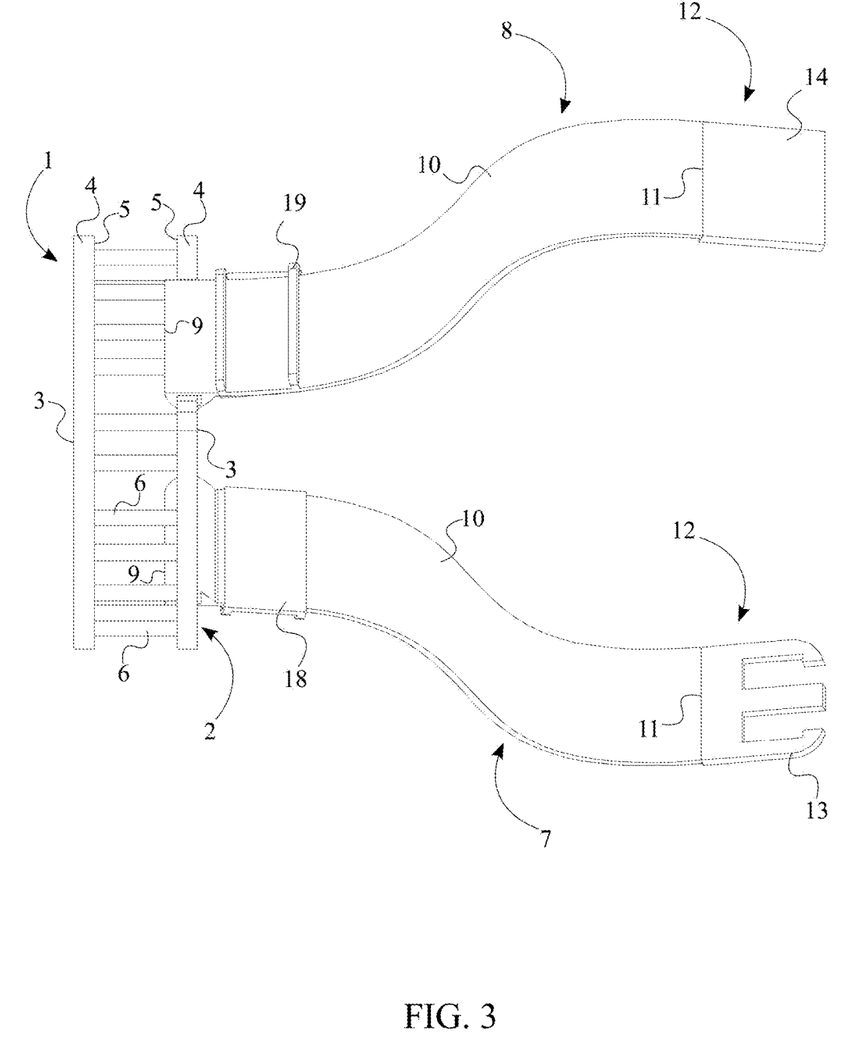
FIG. 3 is a side view of the present invention.

As seen in FIG. 3, the first panel 1 and the second panel 2 each comprise an outer surface 3, a structural body 4, and an inner surface 5. The structural body 4 extends from the outer surface 3 to the inner surface 5 and determines the overall thickness of both the first panel 1 and the second panel 2. The overall dimensions and thicknesses of the first panel 1 and the second panel 2 can vary in different embodiments of the present invention. When connected in between the first panel 1 and the second panel 2, the plurality of connecting members 6 is connected to the inner surface 5 of both the first panel 1 and the second panel 2.

The length and material of the first strap portion 7 and the second strap portion 8 can vary in different embodiments of the present invention. Regardless of the length and material, the first strap portion 7 and the second strap portion 8 each comprise a fixed end 9, a strap body 10, and a free end 11. The strap body 10 extends from the fixed end 9 to the free end 11 and determines the overall length of the first strap portion 7 and the second strap portion 8. The first strap portion 7 is terminally connected to the second panel 2 at the fixed end 9 Likewise, the second strap portion 8 is also terminally connected to the second panel 2 at the fixed end 9.

Figure 4:
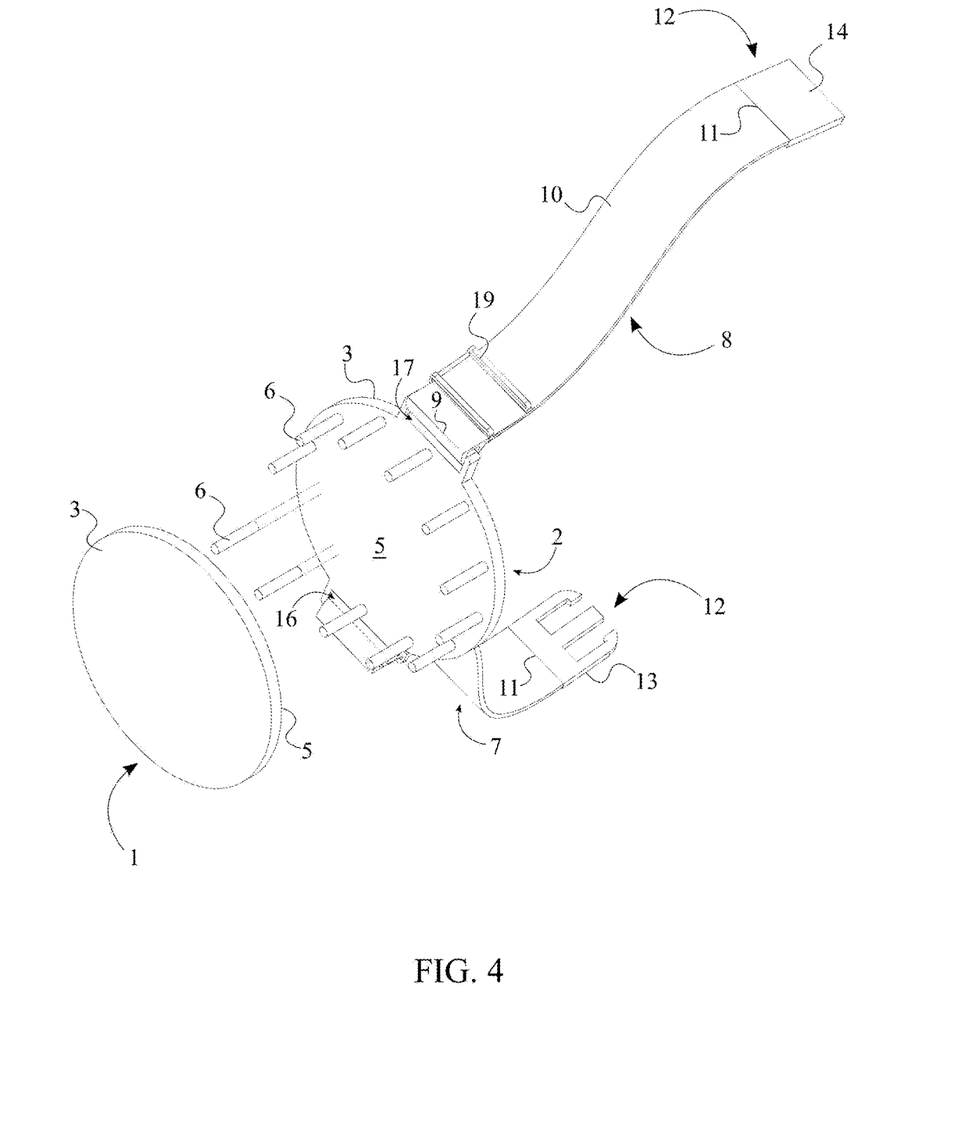
FIG. 4 is a perspective exploded view of the present invention.

As discussed before, the plurality of connecting members 6 is positioned in between the first panel 1 and the second panel 2. In one embodiment of the present invention, the plurality of connecting members 6 can be permanently connected in between the first panel 1 and the second panel 2. However, as seen in FIG. 4, in another embodiment of the present invention, the plurality of connecting members 6 can be removably attached in between the first panel 1 and the second panel 2. The removability allows the user to replace the plurality of connecting members 6 if needed. The removability also allows the user to remove a set of members from the plurality of connecting members 6 to accommodate a fishing rod with a larger diameter.

To firmly wrap the first strap portion 7 and the second strap portion 8 around the external weighted object, the present invention further comprises a fastening mechanism 12. When the fastening mechanism 12 is used, the free end 11 of the first strap portion 7 is removably attached to the free end 11 of the second strap portion 8 through the fastening mechanism 12 that can vary in different embodiments of the present invention.

Figure 1:
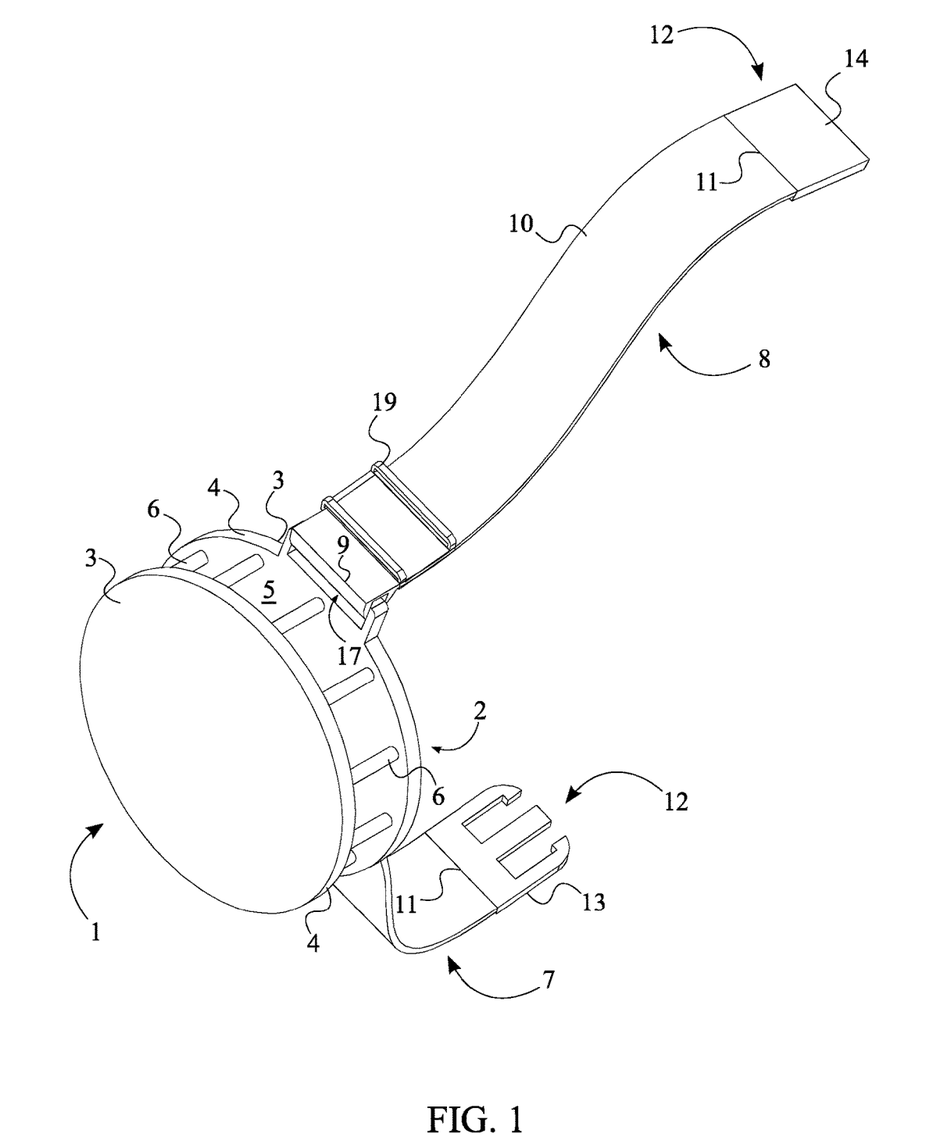
FIG. 1 is a perspective view of the present invention.
Figure 2:
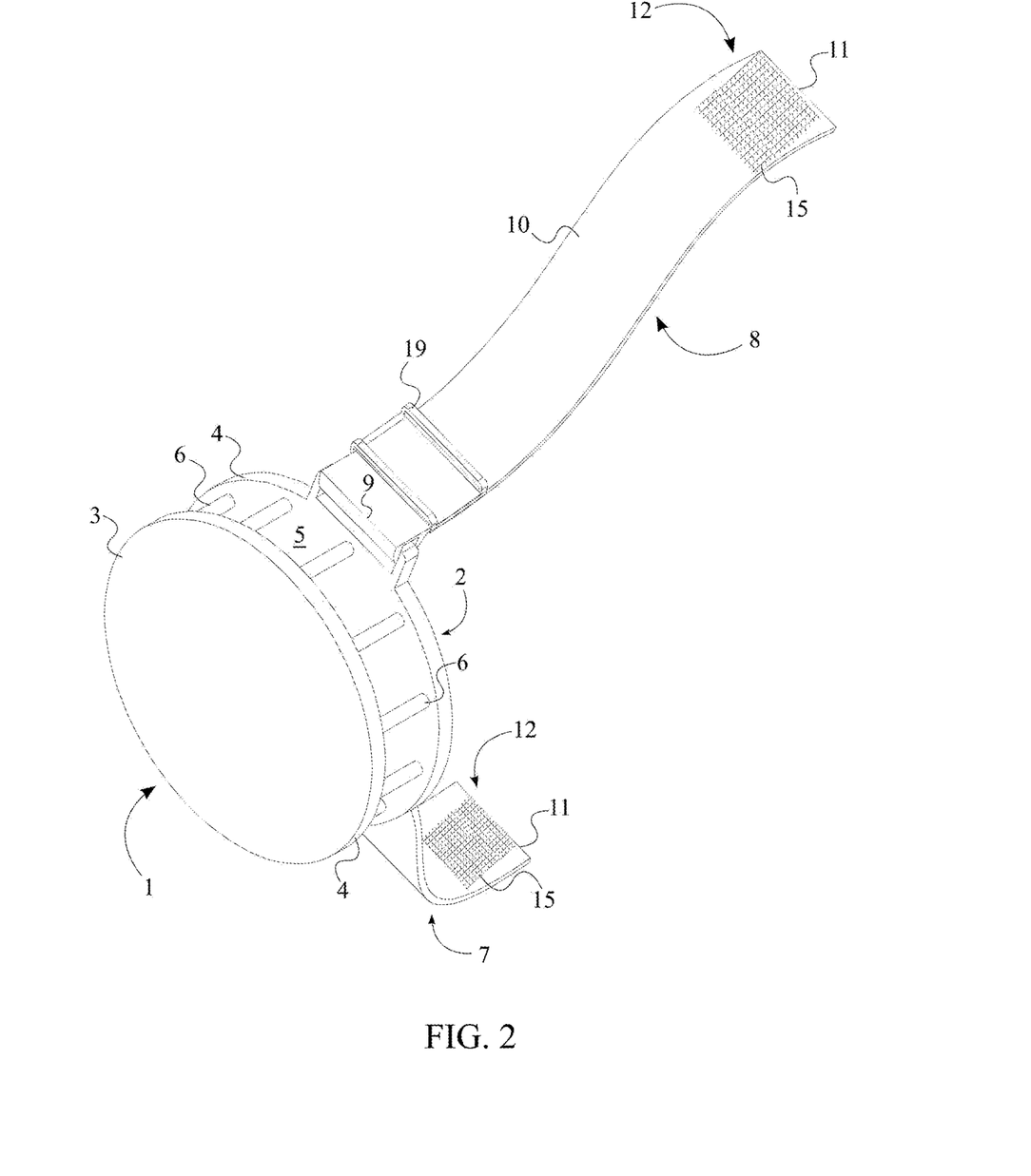
FIG. 2 is another perspective view of the present invention, wherein a plurality of hook and loop fasteners is used as the fastening mechanism.
Figure 5:
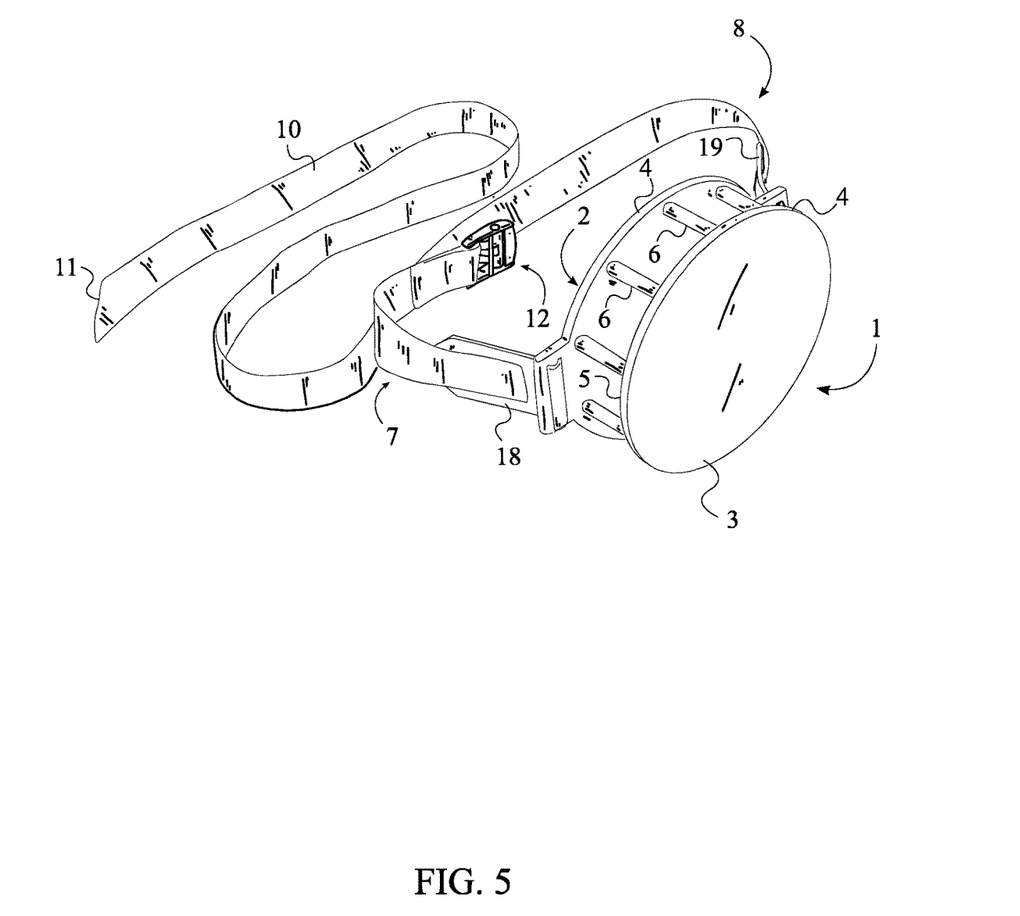
FIG. 5 is a perspective view of the present invention, wherein a cam-lock style buckle is used as the fastening mechanism.

In the preferred embodiment as shown in FIG. 1, FIG. 3, and FIG. 4, the fastening mechanism 12 comprises a buckle 13 and a buckle-receiving frame 14. The buckle 13 is terminally connected to the free end 11 of the first strap portion 7. To receive the buckle 13, the buckle-receiving frame 14 is terminally connected to the free end 11 of the second strap portion 8. When the first strap portion 7 and the second strap portion 8 are wrapped around the external weighted object, the buckle 13 is positioned into the buckle-receiving frame 14. As illustrated in FIG. 2, in another embodiment of the present invention, a plurality of hook and loop fasteners 15 can be used to attach the free end 11 of the first strap portion 7 to the free end 11 of the second strap portion 8. As illustrated in FIG. 5, a cam-lock style buckle can be used in a different embodiment of the present invention. In such instances, the free end 11 of the second strap portion 8 will be positioned through the cam-lock style buckle which is terminally connected to the free end 9 of the first strap portion 7. Overall, various fastening methods can be used in different embodiments of the present invention to secure the first strap portion 7 and the second strap portion 8 around the external weighted object.

As shown in FIG. 4, to maintain the aesthetic properties of the present invention, and maintain a firm connection at the fixed end 9 of both the first strap portion 7 and the second strap portion 8, the present invention further comprises a first strap receiving slot 16 and a second strap receiving slot 17. The first strap receiving slot 16 is laterally connected to the structural body 4 of the second panel 2, and the fixed end 9 of the first strap portion 7 is positioned into the first strap receiving slot 16. Likewise, the second strap receiving slot 17 is laterally connected to the structural body 4 of the second panel 2. More specifically, the second strap receiving slot 17 is positioned opposite the first strap receiving slot 16 and across the structural body 4 of the second panel 2. Thus, the fixed end 9 of the second strap portion 8 can be positioned into the second strap receiving slot 17. Even though the present invention utilizes the first strap receiving slot 16 and the second strap receiving slot 17, multiple first strap receiving slots and multiple second strap receiving slots can be used in other embodiments of the present invention.

The external weighted object used with the present invention varies from one location to another. For instance, in one location the external weighted object can be a rock that needs significant length in both the first strap portion 7 and the second strap portion 8. In another instance, the external weighted object can be a pole which requires minimal length in the first strap portion 7 and the second strap portion 8. To adjust the length of both the first strap portion 7 and the second strap portion 8 according to the external weighted object, the present invention further comprises a first strap length adjuster 18 and a second strap length adjuster 19 as seen in FIG. 3. To fulfill the intended functionalities, the first strap length adjuster 18 is integrated into the strap body 10 of the first strap portion 7 adjacent the fixed end 9. Similarly, the second strap length adjuster 19 is integrated into the strap body 10 of the second strap portion 8 adjacent the fixed end 9.

Figure 6:
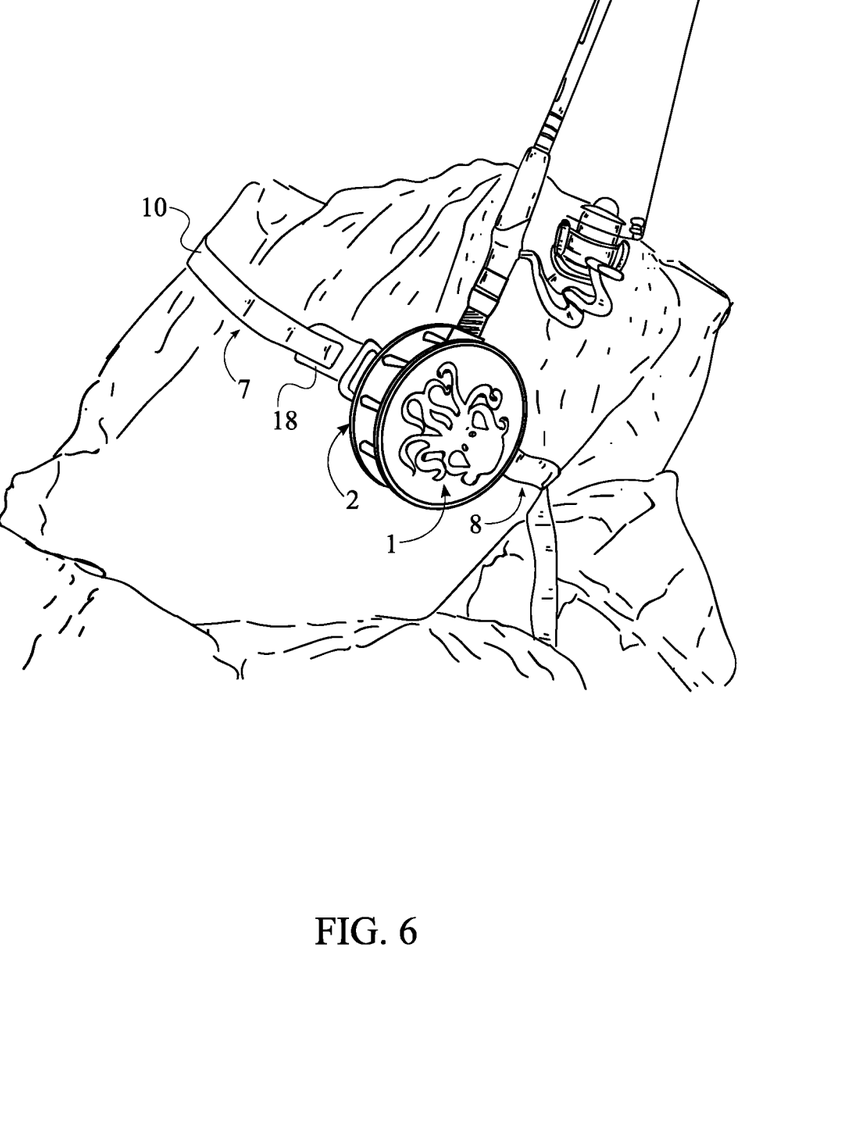
FIG. 6 is an illustration of the present invention being mounted onto an external weighted object.

When the present invention is in use, the following process flow is generally followed. Initially, the handle of the fishing rod is positioned in between an arbitrary member of the plurality of connecting members 6 and an adjacent member of the plurality of connecting members 6. Next, the handle is pushed and secured in between the first panel 1 and the second panel 2. Since the arbitrary member and the adjacent member determine the angle in which the fishing rod is positioned in, the arbitrary member and the adjacent member varies according to the fishing location and user preference. When the fishing rod handle is secured in between the first panel 1 and the second panel 2, the first strap portion 7 and the second strap portion 8 are wrapped around the external weighted object as illustrated in FIG. 6. The first strap length adjuster 18 and the second strap length adjuster 19 are used if the length of the first strap portion 7 and the second strap portion 8 needs to be adjusted. When the appropriate length is selected for the first strap portion 7 and the second strap portion 8, the fastening mechanism 12 is used to attach the free end 11 of the first strap portion 7 to the free end 11 of the second strap portion 8. As a result, the second panel 2 will be pressed against the external weighted object.

Although the invention has been explained in relation to its preferred embodiment, it is to be understood that many other possible modifications and variations can be made without departing from the spirit and scope of the invention as hereinafter claimed.

What is claimed is:

1. A fishing rod holder comprises:
a first panel;
a second panel;
a plurality of connecting members;
a first strap portion;
a second strap portion;
the first panel being terminally mounted to the plurality of connecting members;
the second panel being terminally mounted to the plurality of connecting members opposite the first panel and along the plurality of connecting members;
the first panel being centrally aligned with the second panel;
each of the plurality of connecting members being radially and equidistantly positioned in between the first panel and the second panel;
the first strap portion being terminally connected to the second panel; and
the second strap portion being terminally connected to the second panel opposite the first strap portion and across the second panel.

2. The fishing rod holder as claimed in claim 1 further comprises:
the first panel and the second panel each comprise an outer surface, a structural body, and an inner surface;
the structural body extending from the outer surface to the inner surface; and
the plurality of connecting members being connected to the inner surface of the first panel and the inner surface of the second panel.

3. The fishing rod holder as claimed in claim 1 further comprises:
the first strap portion and the second strap portion each comprise a fixed end, a strap body, and a free end;
the strap body extending from the fixed end to the free end;
the fixed end of the first strap portion being connected to the second panel; and
the fixed end of the second strap portion being connected to the second panel opposite the first strap portion.

4. The fishing rod holder as claimed in claim 1, wherein each of the plurality of connecting members are removably attached to the first panel and the second panel.

5. The fishing rod holder as claimed in claim 1 further comprises:
a fastening mechanism; and
a free end of the first strap portion being removably attached to a free end of the second strap portion through the fastening mechanism.

6. The fishing rod holder as claimed in claim 5 further comprises:
the fastening mechanism comprises a buckle and a buckle-receiving frame;
the buckle being terminally connected to the free end of the first strap portion;
the buckle-receiving frame being terminally connected to the free end of the second strap portion; and
the buckle being removably positioned into the buckle-receiving frame.

7. The fishing rod holder as claimed in claim 5, wherein the fastening mechanism is a plurality of hook and loop fasteners.

8. The fishing rod holder as claimed in claim 1 further comprises:
a first strap receiving slot;
a second strap receiving slot;
the first strap receiving slot being laterally connected to a structural body of the second panel;
the second strap receiving slot being laterally connected to the structural body of the second panel;
the second strap receiving slot being positioned opposite the first strap receiving slot across the structural body of the second panel;
the fixed end of the first strap portion being positioned into the first strap receiving slot; and
the fixed end of the second strap portion being positioned into the second strap receiving slot.

9. The fishing rod holder as claimed in claim 1 further comprises:
a first strap length adjuster; and the first strap length adjuster being integrated into a strap body of the first strap portion adjacent a fixed end of the first strap portion.

10. The fishing rod holder as claimed in claim 1 further comprises:
a second strap length adjuster; and
the second strap length adjuster being integrated into a strap body of the second strap portion adjacent a fixed end of the second strap portion.

11. A fishing rod holder comprises:
a first panel;
a second panel;
a plurality of connecting members;
a first strap portion;
a second strap portion;
a fastening mechanism;
the first panel being terminally mounted to the plurality of connecting members;
the second panel being terminally mounted to the plurality of connecting members opposite the first panel and along the plurality of connecting members;
the first panel being centrally aligned with the second panel;
each of the plurality of connecting members being radially and equidistantly positioned in between the first panel and the second panel;
the first strap portion being terminally connected to the second panel;
the second strap portion being terminally connected to the second panel opposite the first strap portion and across the second panel; and
a free end of the first strap portion being removably attached to a free end of the second strap portion through the fastening mechanism.

12. The fishing rod holder as claimed in claim 11 further comprises:
the first panel and the second panel each comprise an outer surface, a structural body, and an inner surface;
the structural body extending from the outer surface to the inner surface; and
the plurality of connecting members being connected to the inner surface of the first panel and the inner surface of the second panel.

13. The fishing rod holder as claimed in claim 11 further comprises:
the first strap portion and the second strap portion each further comprise a fixed end, and a strap body;
the strap body extending from the fixed end to the free end;
the fixed end of the first strap portion being connected to the second panel; and
the fixed end of the second strap portion being connected to the second panel opposite the first strap portion.

14. The fishing rod holder as claimed in claim 11, wherein each of the plurality of connecting members are removably attached to the first panel and the second panel.

15. The fishing rod holder as claimed in claim 11 further comprises:
the fastening mechanism comprises a buckle and a buckle-receiving frame;
the buckle being terminally connected to the free end of the first strap portion;
the buckle-receiving frame being terminally connected to the free end of the second strap portion; and
the buckle being removably positioned into the buckle-receiving frame.

16. The fishing rod holder as claimed in claim 11, wherein the fastening mechanism is a plurality of hook and loop fasteners.

17. The fishing rod holder as claimed in claim 11 further comprises:
a first strap receiving slot;
a second strap receiving slot;
the first strap receiving slot being laterally connected to a structural body of the second panel;
the second strap receiving slot being laterally connected to the structural body of the second panel;
the second strap receiving slot being positioned opposite the first strap receiving slot across the structural body of the second panel;
the fixed end of the first strap portion being positioned into the first strap receiving slot; and
the fixed end of the second strap portion being positioned into the second strap receiving slot.

18. The fishing rod holder as claimed in claim 11 further comprises:
a first strap length adjuster; and
the first strap length adjuster being integrated into a strap body of the first strap portion adjacent a fixed end of the first strap portion.

19. The fishing rod holder as claimed in claim 11 further comprises:
a second strap length adjuster; and
the second strap length adjuster being integrated into a strap body of the second strap portion adjacent a fixed end of the second strap portion.

* * * * *